United States Patent
Wainerdi et al.

(10) Patent No.: US 9,114,995 B2
(45) Date of Patent: Aug. 25, 2015

(54) SEPARATING METALLIC AND SEMICONDUCTOR SWNTS WITH SINUSOIDAL DIPOLE-INDUCING MAGNETIC FIELDS

(71) Applicant: Texas Instruments Incorporated, Dallas, TX (US)

(72) Inventors: James Cooper Wainerdi, Plano, TX (US); Robert Reid Doering, Garland, TX (US); Luigi Colombo, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/305,119

(22) Filed: Jun. 16, 2014

(65) Prior Publication Data

US 2014/0291211 A1    Oct. 2, 2014

Related U.S. Application Data

(60) Division of application No. 12/967,637, filed on Dec. 14, 2010, now Pat. No. 8,789,705, which is a continuation-in-part of application No. 12/964,567, filed on Dec. 9, 2010, now abandoned.

(60) Provisional application No. 61/267,913, filed on Dec. 9, 2009.

(51) Int. Cl.
| | |
|---|---|
| *B03C 1/30* | (2006.01) |
| *C01B 31/02* | (2006.01) |
| *B03C 1/005* | (2006.01) |
| *B03C 1/033* | (2006.01) |

(52) U.S. Cl.
CPC ............ *C01B 31/0266* (2013.01); *B03C 1/005* (2013.01); *B03C 1/0335* (2013.01); *B03C 2201/20* (2013.01)

(58) Field of Classification Search
CPC ........ B03C 1/005; B03C 1/033; B03C 1/031; B03C 1/025; B03C 1/23; B03C 1/0335; B03C 2201/20; C01B 31/0266; C01B 31/022; C01B 2202/02
USPC ..................... 209/3, 18, 38, 39, 40, 215, 235; 977/845, 901
See application file for complete search history.

(56) References Cited

U.S. PATENT DOCUMENTS

| | | | | |
|---|---|---|---|---|
| 6,790,425 | B1 * | 9/2004 | Smalley et al. | ............ 423/447.1 |
| 7,074,310 | B2 * | 7/2006 | Smalley et al. | ................ 204/450 |
| 7,131,537 | B2 * | 11/2006 | Papadimitrakopoulos | ..... 209/18 |
| 2004/0129447 | A1 * | 7/2004 | Beeli et al. | .................. 174/125.1 |
| 2008/0176765 | A1 * | 7/2008 | Rothwarf | ......................... 506/16 |

* cited by examiner

*Primary Examiner* — Joseph C Rodriguez
*Assistant Examiner* — Kalyanavenkateshware Kumar
(74) *Attorney, Agent, or Firm* — Lawrence J. Bassuk; Charles A. Brill; Frank D. Cimino

(57) ABSTRACT

A process of sorting metallic single wall carbon nanotubes (SWNTs) from semiconducting types by disposing the SWNTs in a dilute fluid, exposing the SWNTs to a dipole-inducing magnetic field which induces magnetic dipoles in the SWNTs so that a strength of a dipole depends on a conductivity of the SWNT containing the dipole, orienting the metallic SWNTs, and exposing the SWNTs to a magnetic field with a spatial gradient so that the oriented metallic SWNTs drift in the magnetic field gradient and thereby becomes spatially separated from the semiconducting SWNTs. An apparatus for the process of sorting SWNTs is disclosed.

7 Claims, 10 Drawing Sheets

SEPARATING METALLIC AND SEMICONDUCTOR SWNTS WITH SINUSOIDAL DIPOLE-INDUCING MAGNETIC FIELDS

CROSS-REFERENCE TO RELATED APPLICATIONS

This application is a Divisional of application Ser. No. 12/967,637, filed Dec. 14, 2010, now U.S. Pat. No. 8,789,705, issued Jul. 29, 2014;

Which was a Continuation-in-Part of application Ser. No. 12/964,567, filed Dec. 9, 2010, now abandoned;

Which claims the benefit of priority under U.S.C. §119(e) of U.S. Provisional Application 61/267,913 (Texas Instruments), filed Dec. 9, 2009.

FIELD OF THE INVENTION

This invention relates to the field of carbon nanotubes. More particularly, this invention relates to sorting single wall carbon nanotubes.

BACKGROUND OF THE INVENTION

Single wall carbon nanotubes (SWNTs) may be metallic or semiconducting, and may have varying diameters and lengths. Methods of forming SWNTs may produce mixtures of metallic and semiconducting SWNTs with a range of diameters and lengths. Applications using SWNTs may be improved if SWNTs of uniform conductivity are provided, for example all semiconducting SWNTs or all metallic SWNTs. Accordingly, a method and apparatus for sorting SWNTs is desired.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

Single wall carbon nanotubes (SWNTs) may be sorted into metallic and semiconducting types by disposing the SWNTs in a dilute fluid, exposing the SWNTs to a dipole-inducing magnetic field which induces magnetic dipoles in the SWNTs so that a strength of a dipole depends on a conductivity of the SWNT containing the dipole, orienting the metallic SWNTs, and exposing the SWNTs to a magnetic field with a spatial gradient so that the oriented metallic SWNTs drift in the magnetic field gradient thereby becoming spatially separated from the semiconducting SWNTs. An apparatus for the process of sorting SWNTs is disclosed.

DETAILED DESCRIPTION OF EXAMPLE EMBODIMENTS

Figure 1A:
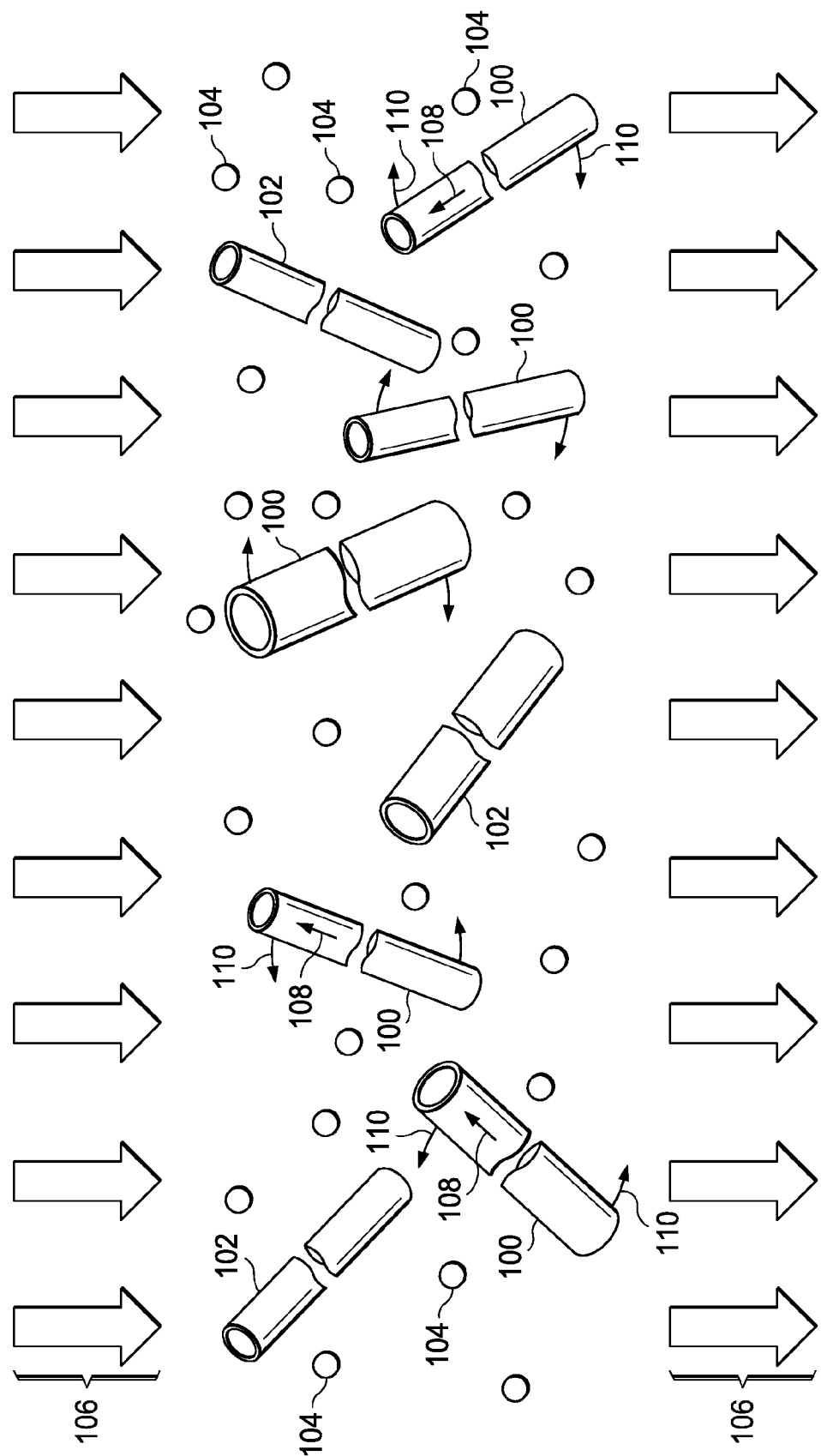
FIG. 1A through FIG. 1C depict a process for sorting metallic SWNTs from semiconducting SWNTs according to an embodiment.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

For the purposes of this description, the term "substantially equal" is understood to mean equal within manufacturing tolerances or within unintended variations encountered during realizations of embodiments.

Single wall carbon nanotubes (SWNTs) may be sorted into metallic and semiconducting types by a process including disposing the SWNTs in a dilute fluid such as a gas at a pressure below 1 millitorr, and exposing the SWNTs to a dipole-inducing magnetic field which increases with time thereby inducing a magnetic dipole in each metallic SWNT. A strength of the dipole depends on an electrical conductivity of the SWNT. Metallic SWNTs may have dipoles with strengths at least two orders of magnitude greater than dipoles possibly formed in semiconducting SWNTs. The metallic SWNTs become oriented in the dipole-inducing magnetic field. A time rate of change of the dipole-inducing magnetic field is sufficient to produce an orientation configuration of the metallic SWNTs within 45 degrees of an axis of the dipole-inducing magnetic field, for example at least 1000 Tesla/ second. The SWNTs are exposed to a gradient magnetic field with a spatial gradient so that the oriented metallic SWNTs drift in the gradient magnetic field and thereby becomes spatially separated from the semiconducting SWNTs. An apparatus for the process of sorting SWNTs is disclosed.

Figure 1B:
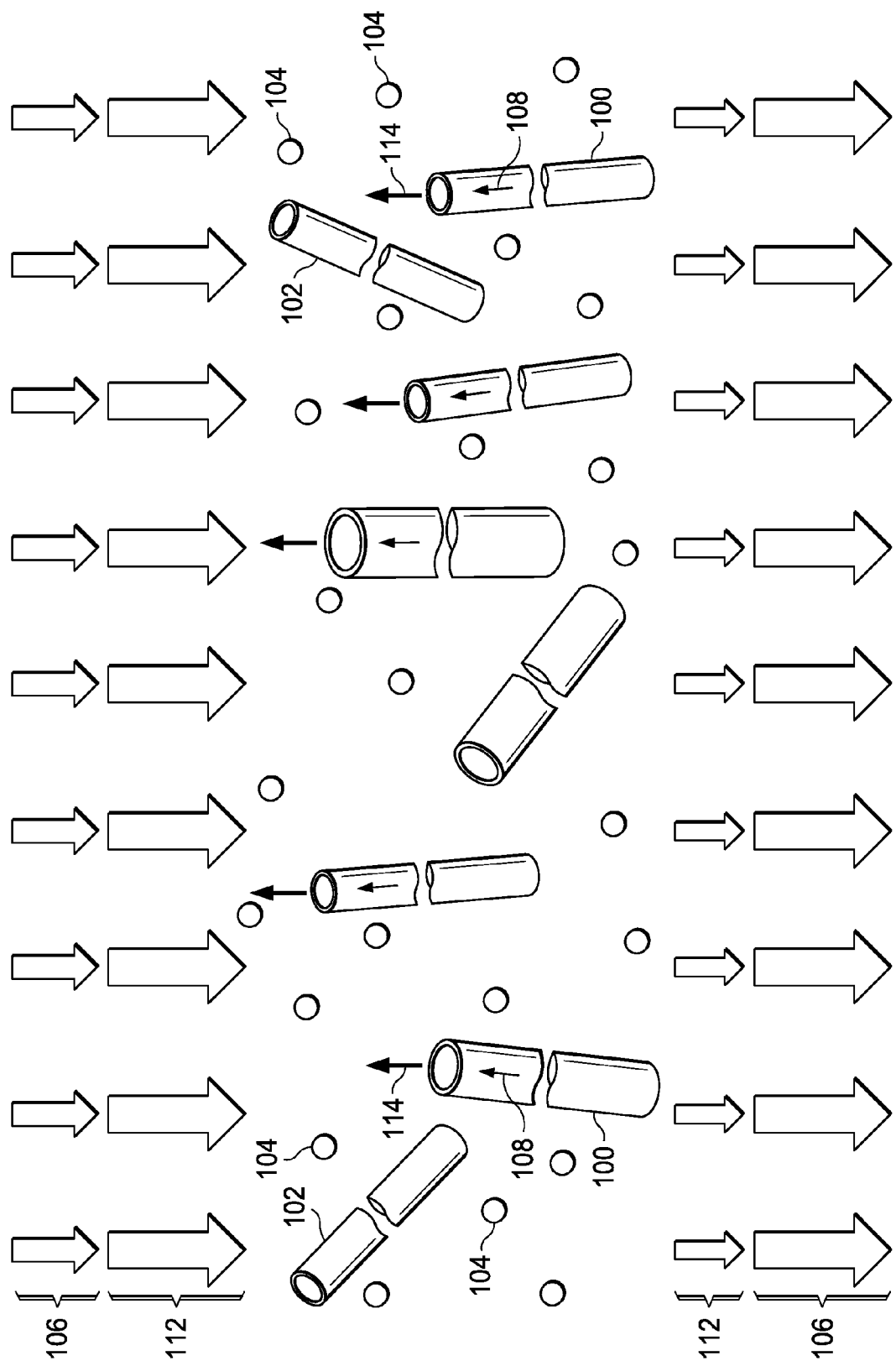
Figure 1C:
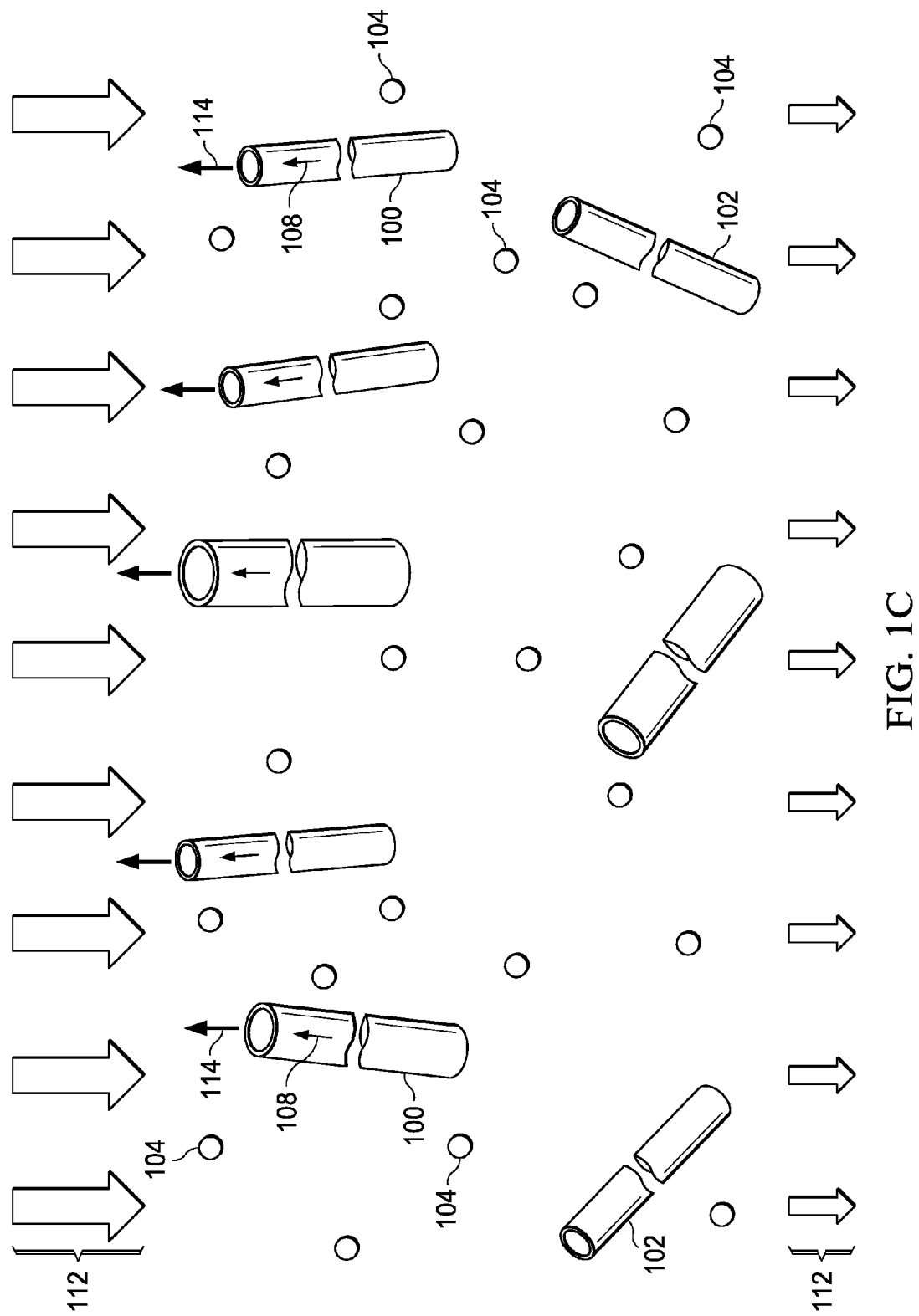

FIG. 1A through FIG. 1C depict a process for sorting metallic SWNTs from semiconducting SWNTs according to an embodiment. Referring to FIG. 1A, Metallic SWNTs 100 and semiconducting SWNTs 102 are disposed in a dilute fluid 104 such as a gas with a pressure below 1 millitorr. At a beginning of the process of the instant embodiment, the SWNTs 100 and 102 may be randomly oriented. Diameters of a majority the SWNTs 100 and 102 may between 0.6 nanometers and 10 nanometers. Lengths of the SWNTs 100 and 102 may be much greater than the diameters. In one version of the instant embodiment, a majority of the SWNTs 100 and 102 may have lengths greater than a micron. In another version, a majority of the SWNTs 100 and 102 may have lengths greater than 10 microns.

The SWNTs 100 and 102 are exposed to a dipole-inducing magnetic field 106 which has a field strength varying in time that is sufficient to produce an orientation configuration of the metallic SWNTs 100 within 45 degrees of an axis of the dipole-inducing magnetic field, for example at least 1000 Tesla/second. Magnetic dipoles are formed in the metallic SWNTs 100 as indicated in FIG. 1A through FIG. 1C by dipole arrows 108 on the metallic SWNTs 100. Magnetic dipoles may be formed in the semiconducting SWNTs 102, but of much lower strength. Interaction of the magnetic dipoles in the metallic SWNTs 100 and the dipole-inducing magnetic field 106 causes the metallic SWNTs 100 to be oriented parallel with the dipole-inducing magnetic field 106, as depicted in FIG. 1A by rotation arrows 110.

Referring to FIG. 1B, the SWNTs 100 and 102 are exposed to a gradient magnetic field 112 which has a spatial gradient in a field strength of the gradient magnetic field 112. The gradient magnetic field 112 is configured so that the metallic SWNTs 100 with magnetic dipoles drift in a direction of increasing magnetic field strength, as depicted in FIG. 1B and FIG. 1C by drift arrows 114. For example, the spatial gradient in the gradient magnetic field 112 may be parallel to the direction of the dipole-inducing magnetic field 106. The dipole-inducing magnetic field 106 may be present while the SWNTs 100 and 102 are exposed to the gradient magnetic field 112, as depicted in FIG. 1B.

FIG. 1C depicts a subsequent stage of the process of sorting the SWNTs. A plurality of the metallic SWNTs 100 have drifted a sufficient distance from a plurality of the semiconducting SWNTs 102 to allow extraction of the metallic SWNTs 100 and/or the semiconducting SWNTs 102, thereby effectively sorting the metallic SWNTs 100 from the semiconducting SWNTs 102 by their respective electrical conductivities.

Figure 2:
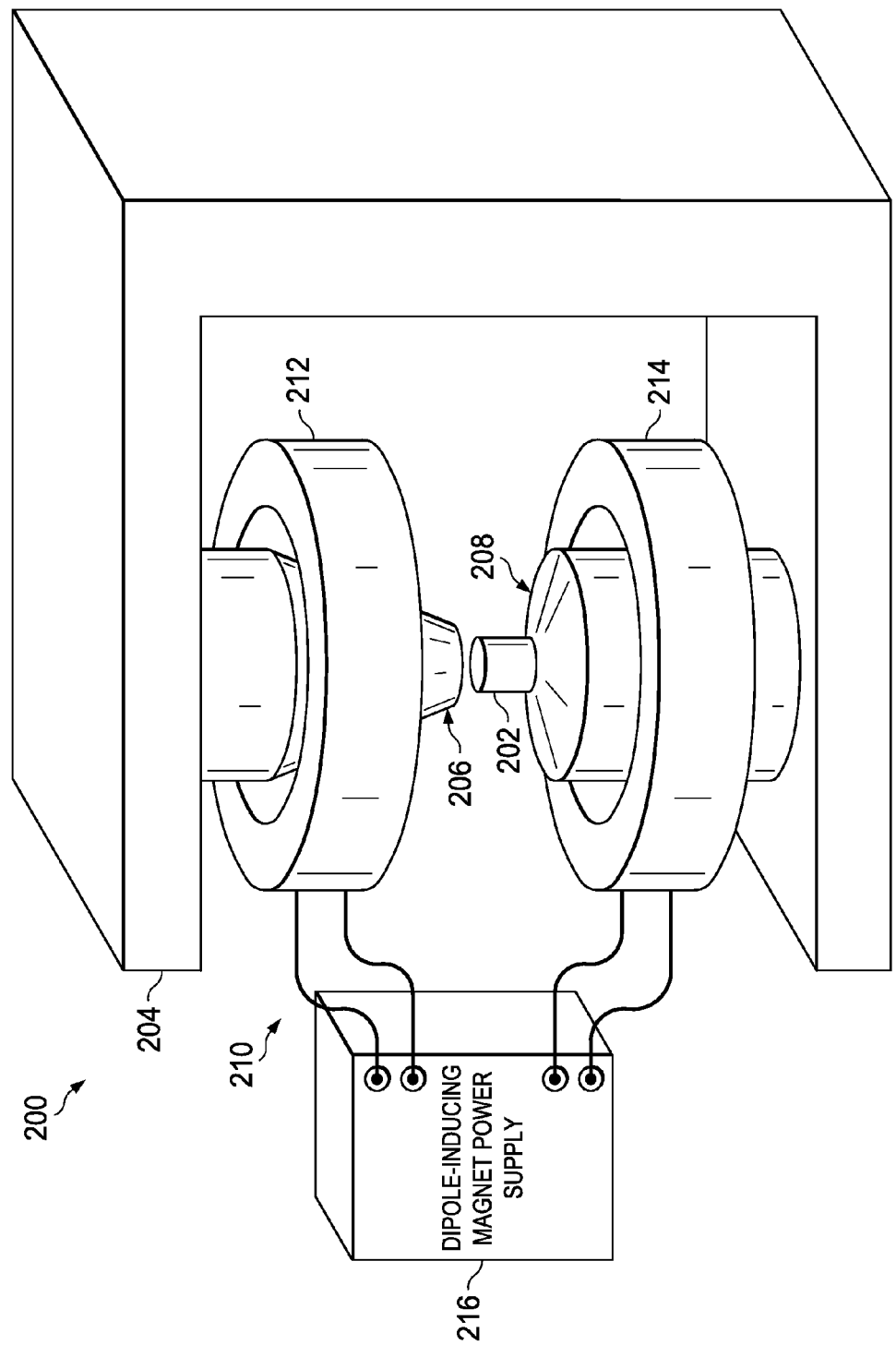
FIG. 2 depicts a SWNT sorting apparatus for sorting SWNTs using the process described in reference to FIG. 1A through FIG. 1C, according to an embodiment.

FIG. 2 depicts a SWNT sorting apparatus for sorting SWNTs using the process described in reference to FIG. 1A through FIG. 1C, according to an embodiment. The SWNT sorting apparatus 200 includes a SWNT chamber 202 containing SWNTs in a fluid as described in reference to FIG. 1A. The SWNT sorting apparatus 200 also includes a spatial gradient static magnet 204. The SWNT chamber 202 is disposed between a tapered pole piece 206 of the spatial gradient static magnet 204 and a flat pole piece 208 of the spatial gradient static magnet 204 opposite the tapered pole piece 206. The spatial gradient static magnet 204 provides a magnetic field with a spatial gradient to the SWNT chamber 202, as described in reference to FIG. 1B. The SWNT sorting apparatus 200 also includes a dipole inducing magnet 210 which includes an upper electromagnet coil 212 and a lower electromagnet coil 214 disposed above and below the SWNT chamber 202, respectively. Current is supplied to the upper electromagnet coil 212 and the lower electromagnet coil 214 by a dipole inducing magnet power supply 216, so as to provide a dipole inducing magnetic field which has a field strength varying in time at a rate of, for example, at least 1000 Tesla/second, as described in reference to FIG. 1A. An example of current waveforms in the upper electromagnet coil 212 and the lower electromagnet coil 214 which provide the dipole inducing magnetic field are discussed in reference to FIG. 3.

Figure 3:
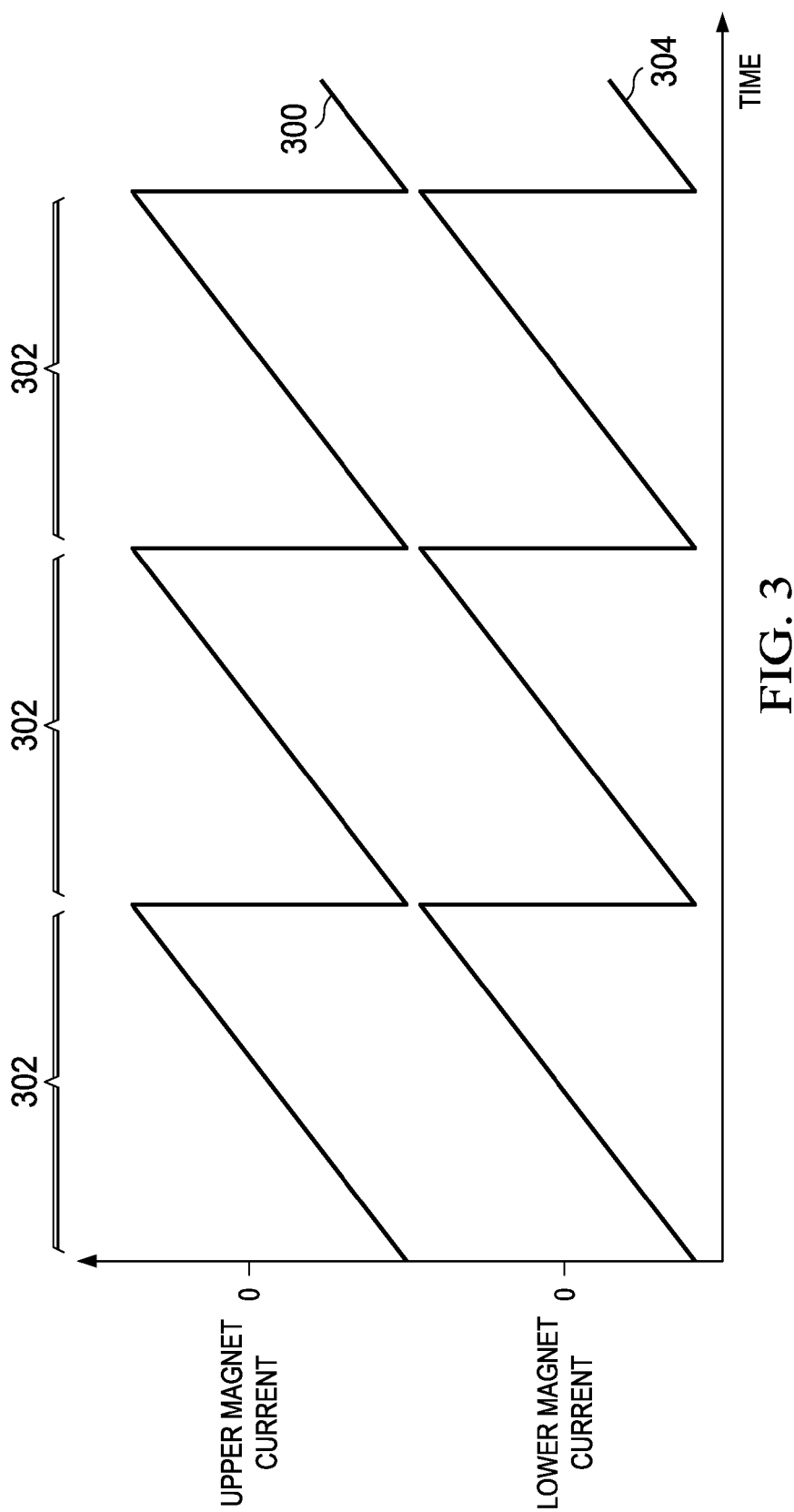
FIG. 3 depicts exemplary current waveforms for the upper electromagnet coil and the lower electromagnet coil of the SWNT sorting apparatus described in reference to FIG. 2.

FIG. 3 depicts exemplary current waveforms for the upper electromagnet coil 212 and the lower electromagnet coil 214 of the SWNT sorting apparatus 200 described in reference to FIG. 2. The upper magnet current waveform 300 has a sawtooth profile, so that current is steadily increasing during a ramp phase 302. The lower magnet current waveform 304 also has a sawtooth profile which is synchronized with the upper magnet current waveform 300 as depicted in FIG. 3. Ramp rates of current through the upper electromagnet coil 212 and the lower electromagnet coil 214 during the ramp phases 302 are sufficient to provide a dipole inducing magnetic field in the SWNT chamber 202 which has a field strength varying in time at a rate of, for example, at least 1000 Tesla/second, as described in reference to FIG. 1A.

Figure 4:
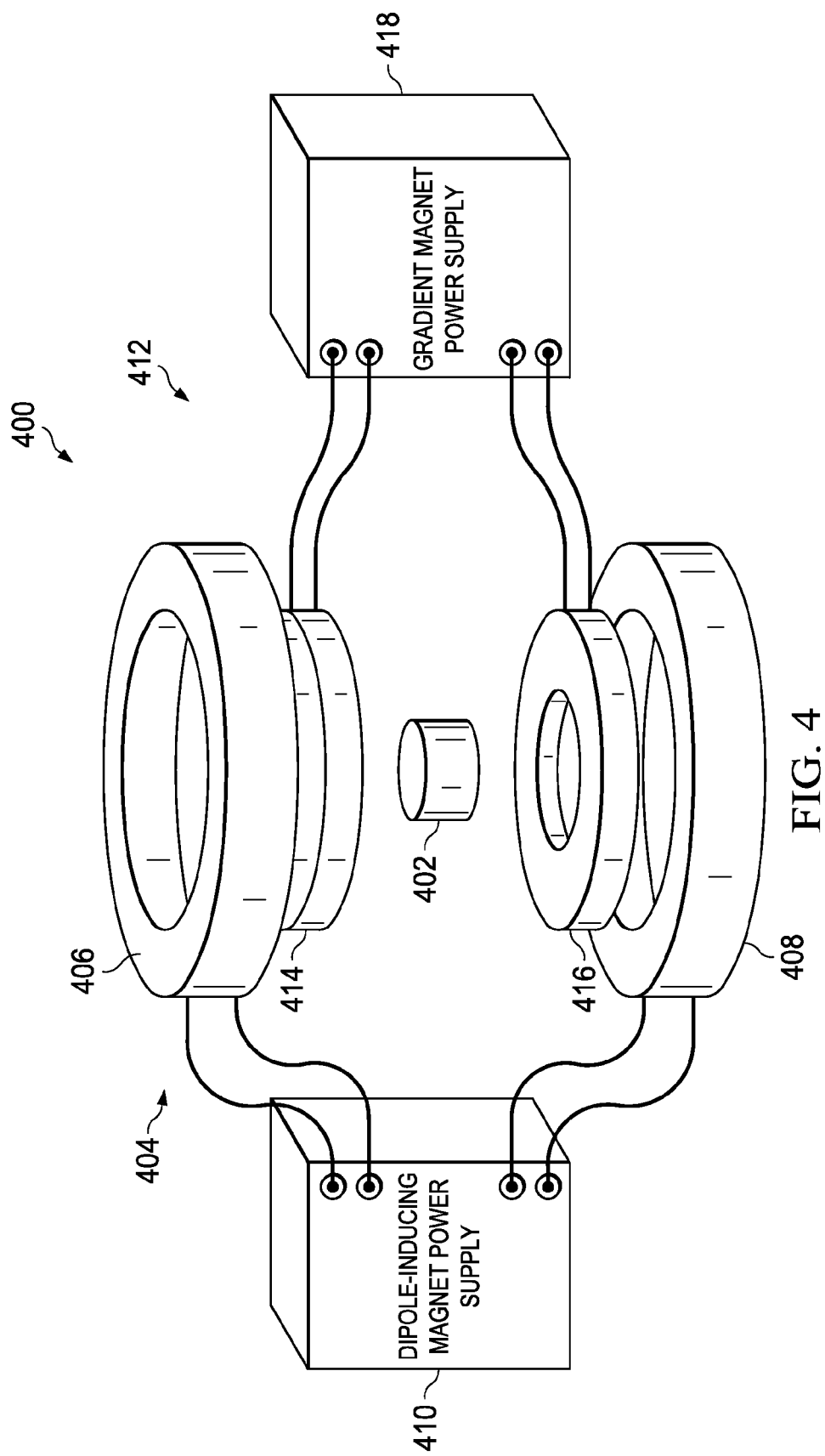
FIG. 4 depicts a SWNT sorting apparatus for sorting SWNTs using the process described in reference to FIG. 1A through FIG. 1C, according to an alternate embodiment.

FIG. 4 depicts a SWNT sorting apparatus for sorting SWNTs using the process described in reference to FIG. 1A through FIG. 1C, according to an alternate embodiment. The SWNT sorting apparatus 400 includes a SWNT chamber 402 containing SWNTs in a fluid as described in reference to FIG. 1A. The SWNT sorting apparatus 400 also includes a dipole inducing magnet 404 which includes an upper dipole-inducing electromagnet coil 406 and a lower dipole-inducing electromagnet coil 408 disposed above and below the SWNT chamber 402, respectively. Current is supplied to the upper dipole-inducing electromagnet coil 406 and the lower dipole-inducing electromagnet coil 408 by a dipole inducing magnet power supply 410, so as to provide a dipole inducing magnetic field which has a field strength varying in time at a rate that is sufficient to produce an orientation configuration of metallic SWNTs within 45 degrees of an axis of the dipole-inducing magnetic field, for example at least 1000 Tesla/second, as described in reference to FIG. 1A. An example of current waveforms in the upper dipole-inducing electromagnet coil 406 and the lower dipole-inducing electromagnet coil 408 which provide the dipole inducing magnetic field are discussed in reference to FIG. 5. Another example of current waveforms in the upper dipole-inducing electromagnet coil 406 and the lower dipole-inducing electromagnet coil 408 which provide the dipole inducing magnetic field are discussed in reference to FIG. 6.

The SWNT sorting apparatus 400 further includes a spatial gradient magnet 412 which includes an upper gradient electromagnet coil 414 and a lower gradient electromagnet coil 416 disposed above and below the SWNT chamber 402, respectively. Current is supplied to the upper gradient electromagnet coil 414 and the lower gradient electromagnet coil 416 by a gradient magnet power supply 418, so as to provide a gradient magnetic field which has a spatial gradient, as described in reference to FIG. 1A. An example of current waveforms in the upper gradient electromagnet coil 414 and the lower gradient electromagnet coil 416 which provide the gradient magnetic field are discussed in reference to FIG. 5. Another example of current waveforms in the upper gradient electromagnet coil 414 and the lower gradient electromagnet coil 416 which provide the gradient magnetic field are discussed in reference to FIG. 6.

Figure 5:
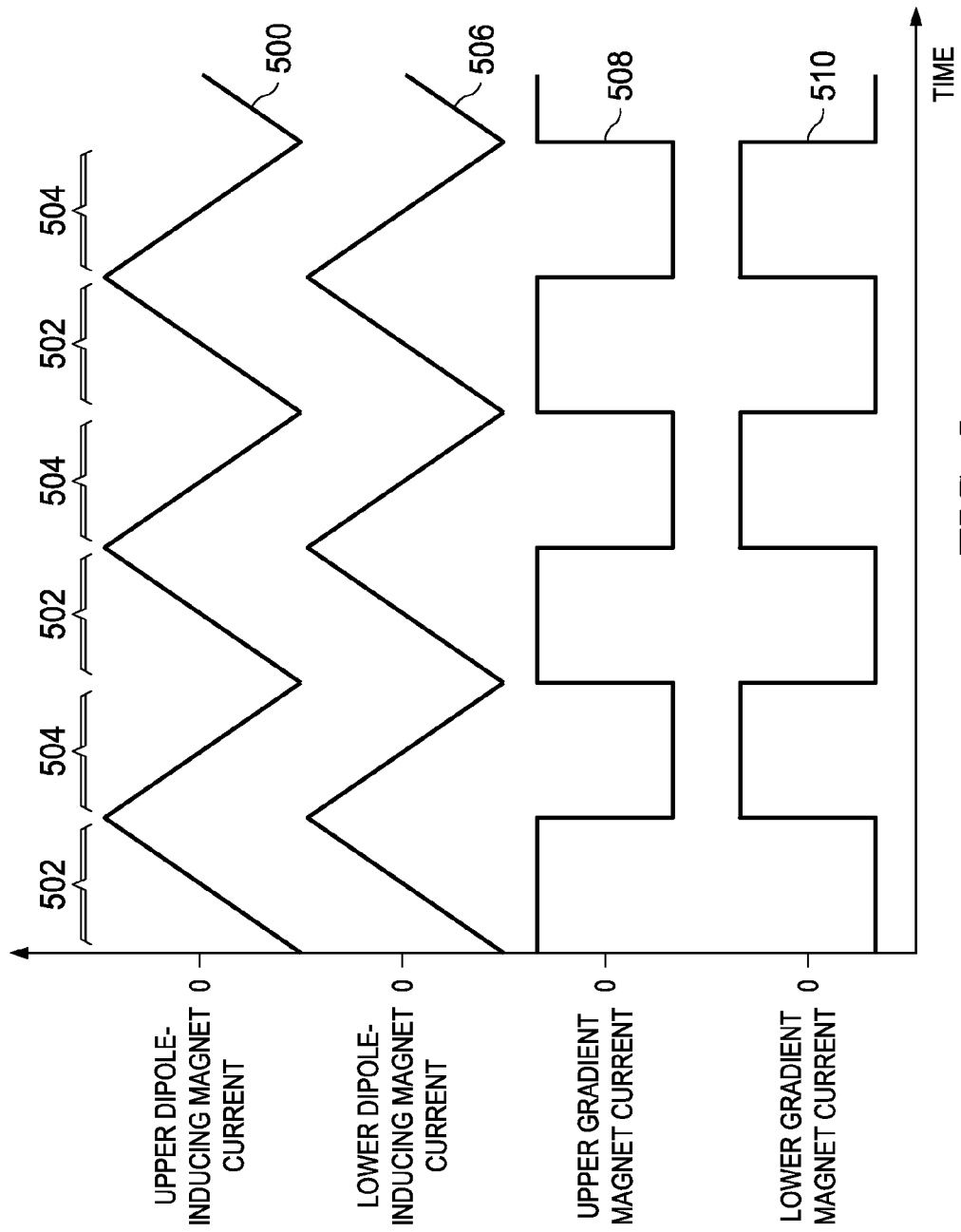
FIG. 5 depicts exemplary current waveforms for the upper dipole-inducing electromagnet coil, the lower dipole-inducing electromagnet coil, the upper gradient electromagnet coil and the lower gradient electromagnet coil of the SWNT sorting apparatus described in reference to FIG. 4.

FIG. 5 depicts exemplary current waveforms for the upper dipole-inducing electromagnet coil 406, the lower dipole-inducing electromagnet coil 408, the upper gradient electromagnet coil 414 and the lower gradient electromagnet coil 416 of the SWNT sorting apparatus 400 described in reference to FIG. 4. An upper dipole-inducing magnet current waveform 500 has a triangular profile, so that current is steadily increasing during a positive ramp phase 502 and is steadily decreasing during a negative ramp phase 504. A lower dipole-inducing magnet current waveform 506 also has a triangular profile which is synchronized with the upper dipole-inducing magnet current waveform 500 as depicted in FIG. 5. Ramp rates of current through the upper dipole-inducing electromagnet coil 406 and the lower dipole-inducing electromagnet coil 408 during the positive ramp phases 502 and the negative ramp phases 504 are sufficient to provide a dipole inducing magnetic field in the SWNT chamber 402 which has a field strength varying in time at a rate that is sufficient to produce an orientation configuration of the metallic SWNTs within 45 degrees of an axis of the dipole-inducing magnetic field, for example at least 1000 Tesla/second, as described in reference to FIG. 1A.

An upper gradient magnet current waveform 508 has a square-wave profile, so that current is positive and substantially constant during the positive ramp phases 502 and is negative and substantially constant during the negative ramp phases 504. A lower gradient magnet current waveform 510 has a square-wave profile opposite the upper gradient magnet current waveform 508, so that current is negative and substantially constant during the positive ramp phases 502 and is positive and substantially constant during the negative ramp phases 504. The upper gradient magnet current waveform 508 and the lower gradient magnet current waveform 510 are synchronized with the upper dipole-inducing magnet current waveform 500 as depicted in FIG. 5. In one version of the instant embodiment, a magnitude of the upper gradient magnet current waveform 508 during the positive ramp phases 502 is substantially equal to a magnitude of the lower gradient magnet current waveform 510 during the positive ramp phases 502, and similarly for the negative ramp phases 504, so that a magnetic field with a spatial gradient is provided in the SWNT chamber 402 which is parallel to the dipole-inducing magnetic field provided by the dipole inducing magnet 404 using the upper dipole-inducing magnet current waveform 500 and the lower dipole-inducing magnet current waveform 506.

Figure 6:
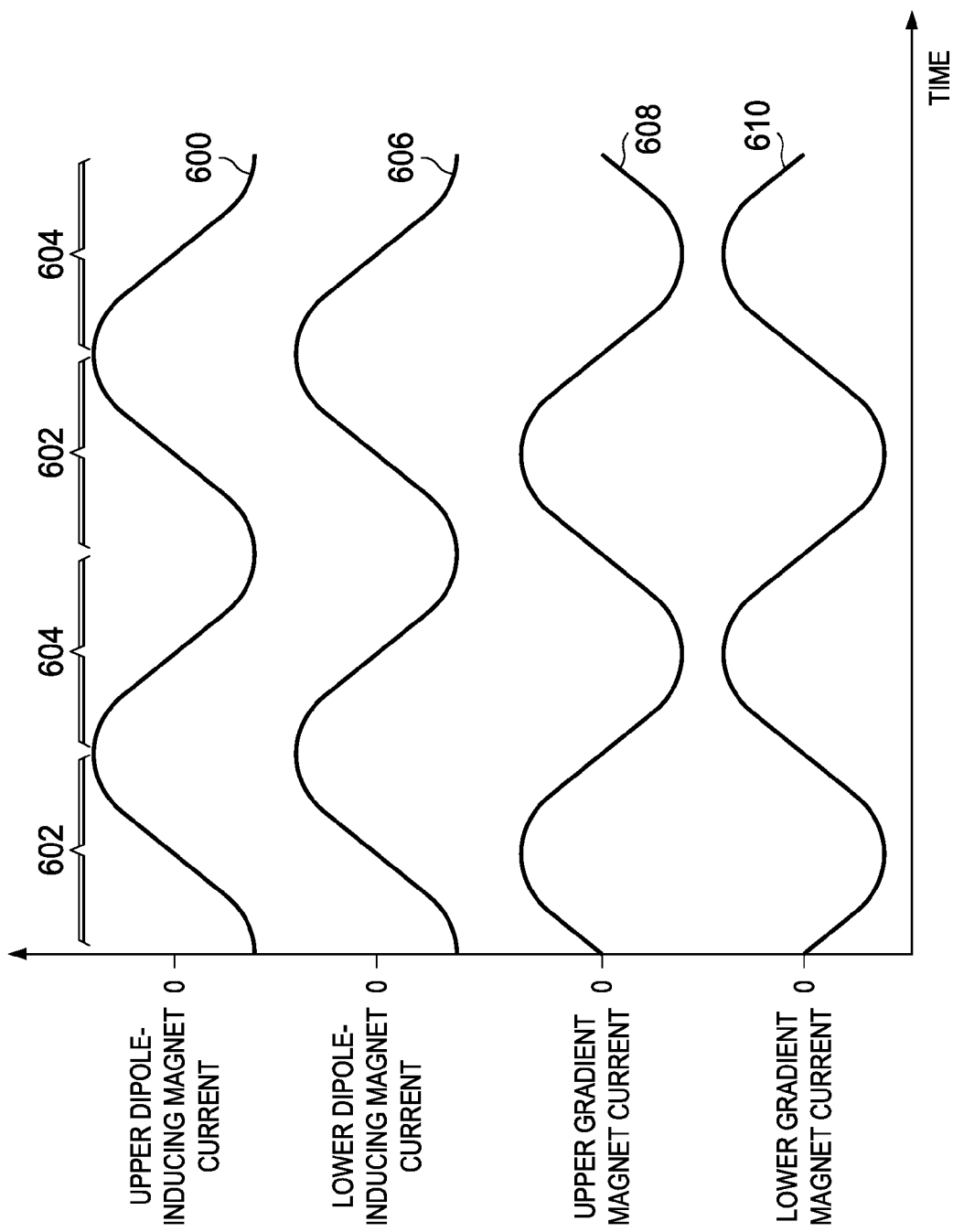
FIG. 6 depicts an alternate set of exemplary current waveforms for the upper dipole-inducing electromagnet coil, the lower dipole-inducing electromagnet coil, the upper gradient electromagnet coil and the lower gradient electromagnet coil of the SWNT sorting apparatus described in reference to FIG. 4.

FIG. 6 depicts an alternate set of exemplary current waveforms for the upper dipole-inducing electromagnet coil 406, the lower dipole-inducing electromagnet coil 408, the upper gradient electromagnet coil 414 and the lower gradient electromagnet coil 416 of the SWNT sorting apparatus 400 described in reference to FIG. 4. An upper dipole-inducing magnet current waveform 600 has a sinusoidal profile, so that current is increasing during a positive slope phase 602 and is decreasing during a negative slope phase 604. A lower dipole-inducing magnet current waveform 606 also has a sinusoidal profile which is synchronized with the upper dipole-inducing magnet current waveform 600 as depicted in FIG. 6. Ramp rates of current through the upper dipole-inducing electromagnet coil 406 and the lower dipole-inducing electromagnet coil 408 during the positive slope phases 602 and the negative slope phases 604 are sufficient to provide a dipole inducing magnetic field in the SWNT chamber 402 which has a field strength varying in time at a rate that is sufficient to produce an orientation configuration of the metallic SWNTs within 45 degrees of an axis of the dipole-inducing magnetic field, for example at least 1000 Tesla/second, as described in reference to FIG. 1A.

An upper gradient magnet current waveform 608 has a sinusoidal profile, so that current is positive during the positive slope phases 602 and is negative during the negative slope phases 604. A lower gradient magnet current waveform 610 has a sinusoidal profile opposite the upper gradient magnet current waveform 608, so that current is negative during the positive slope phases 602 and is positive during the negative slope phases 604. The upper gradient magnet current waveform 608 and the lower gradient magnet current waveform 610 are synchronized with the upper dipole-inducing magnet current waveform 600 as depicted in FIG. 6. In one version of the instant embodiment, a magnitude of the upper gradient magnet current waveform 608 is substantially equal to a magnitude of the lower gradient magnet current waveform 610, so that a magnetic field with a spatial gradient is provided in the SWNT chamber 402 which is parallel to the dipole-inducing magnetic field provided by the dipole inducing magnet 404 using the upper dipole-inducing magnet current waveform 600 and the lower dipole-inducing magnet current waveform 606.

Generating sinusoidal currents in the upper dipole-inducing electromagnet coil 406, the lower dipole-inducing electromagnet coil 408, the upper gradient electromagnet coil 414 and the lower gradient electromagnet coil 416 may reduce a cost and complexity of the SWNT sorting apparatus 400. It will be recognized that the upper dipole-inducing electromagnet coil 406 and the upper gradient electromagnet coil 414 may be combined into a single upper electromagnetic coil with a current waveform which is a combination of the upper dipole-inducing magnet current waveform 600 and the upper gradient magnet current waveform 608, and similarly for the lower electromagnetic coils, thereby further reducing the cost and complexity of the SWNT sorting apparatus 400.

Figure 7:
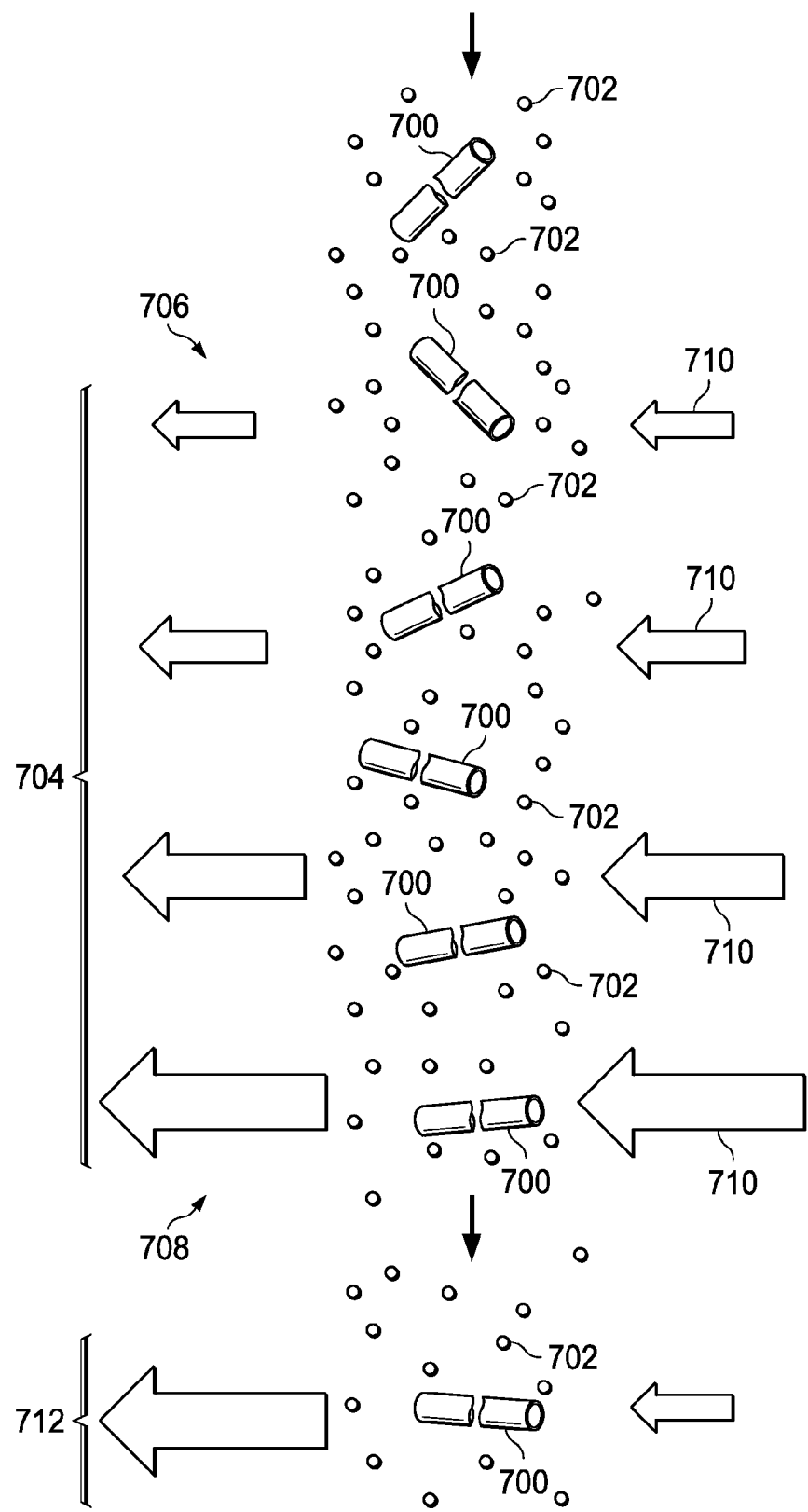
FIG. 7 depicts a process of providing a dipole-inducing magnetic field using a static magnetic field configuration.

FIG. 7 depicts a process of providing a dipole-inducing magnetic field using a static magnetic field configuration. SWNTs 700 in a dilute fluid 702, as described in reference to FIG. 1A, are flowed through a static magnetic field 704 in which a first field strength at a first end 706 of the magnetic field 704 is different from a second field strength at a second end 708 of the magnetic field 704, as indicated schematically in FIG. 7 by field strength arrows 710. The SWNTs 700 may be randomly oriented as they enter the first end 706 of the static magnetic field 704. As the SWNTs 700 flow through the magnetic field 704, a strength of the magnetic field 704 at each SWNT 700 changes with time, thereby inducing a dipole in metallic SWNTs 700. Interaction of the dipoles with the magnetic field 704 causes the metallic SWNTs 700 to be oriented parallel to the magnetic field 704 by the time the SWNTs 700 reach the second end 708 of the magnetic field 704. The SWNTs 700 are subsequently exposed to a gradient magnetic field 712 which provides a magnetic field with a spatial gradient, as described in reference to FIG. 1A. In one version of the instant embodiment, the gradient magnetic field 712 may be spatially separated from the dipole-inducing magnetic field 704, as depicted in FIG. 7. In another version, the gradient magnetic field 712 may be partially or completely spatially coincident with the dipole-inducing magnetic field 704.

In one version of the instant embodiment, the fluid 702 may be pumped through the magnetic field 704 and the SWNTs 700 may be carried through the magnetic field 704 by the fluid 702. In another version, the SWNTs 700 and the fluid 702 may flow by gravity in a vertical configuration. In a further version, the SWNTs 700 may be electrostatically accelerated to provide sufficient velocity to flow through the magnetic field 704. In one version of the instant embodiment, the SWNTs 700 may be substantially stationary in the gradient magnetic field 712, that is an average velocity of the SWNTs 700 in the gradient magnetic field 712 may be much less than an average velocity in the dipole-inducing magnetic field 704. In another embodiment, the SWNTs 700 may flow through the gradient magnetic field 712 at substantially the same velocity as through the dipole-inducing magnetic field 704.

Figure 8:
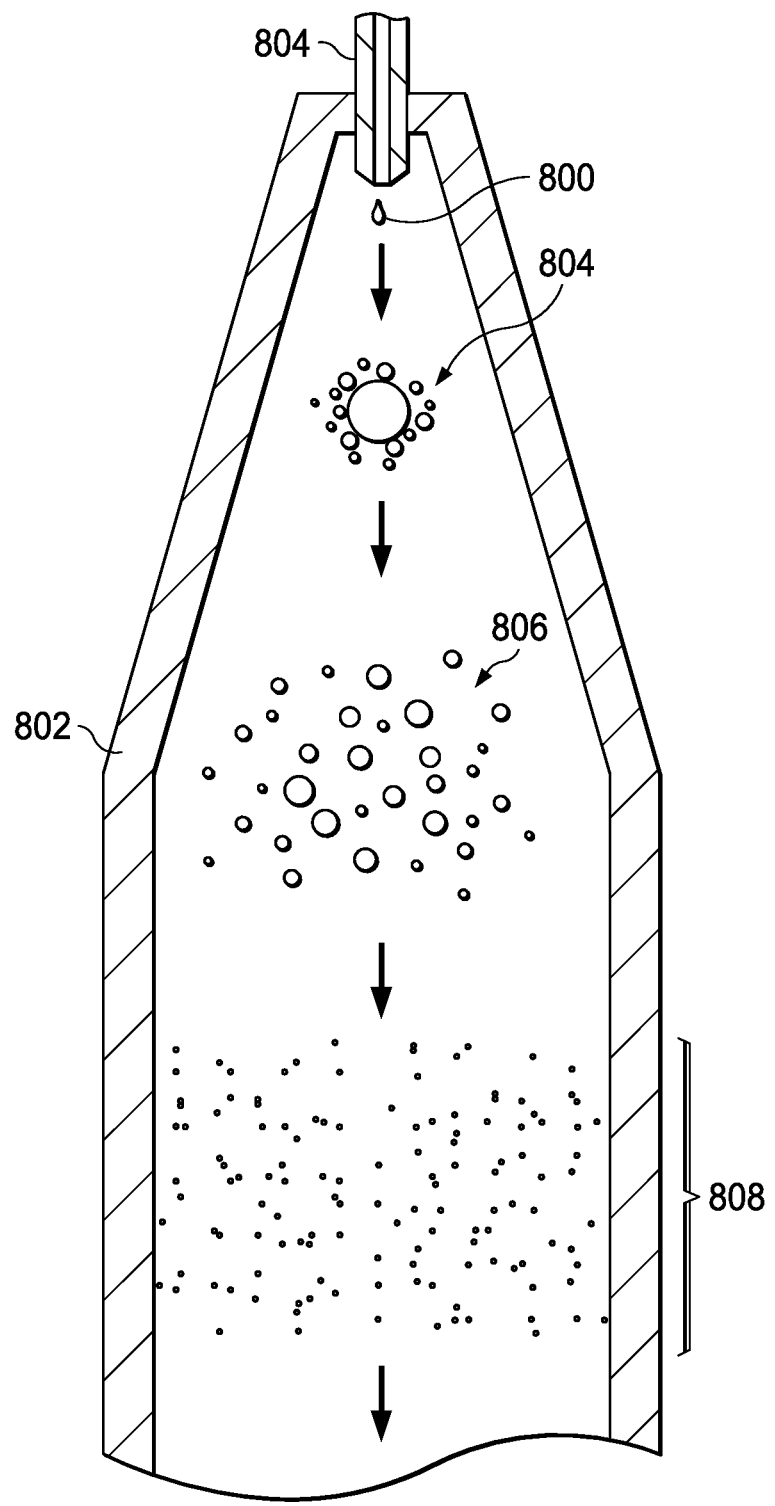
FIG. 8 depicts a process of providing SWNTs in a dilute fluid, as described in reference to FIG. 1A, starting from a liquid suspension of SWNTs.

SWNTs are commonly available commercially suspended in an aqueous solution. FIG. 8 depicts a process of providing SWNTs in a dilute fluid, as described in reference to FIG. 1A, starting from a liquid suspension of SWNTs. A quantity 800 of a liquid suspension of SWNTs is introduced into an evacuated chamber 802, possibly through an injection nozzle 804 or other introduction means. As the SWNTs proceed through the chamber 802, the liquid expands and begins to evaporate 804. Further along, the fluid disperses into dilute droplets 806. After the droplets 806 evaporate, the SWNTs are disposed in a dilute fluid 808 as described in reference to FIG. 1A. Other fluid species, for example hydrogen or an inert gas such as helium nitrogen or argon, may be introduced into the dilute fluid 808. In one version of the instant embodiment, the liquid suspension of SWNTs may be injected into the evacuated chamber 802 in discrete drops. In an alternate version, the liquid suspension of SWNTs may be injected into the evacuated chamber 802 in a continuous stream.

After the SWNTs are disposed in a dilute fluid 808, the SWNTs may be disposed in a dipole-inducing magnetic field and a gradient magnetic field, as discussed in reference to FIG. 1A through FIG. 1C. In one version of the instant embodiment, the SWNTs in the dilute fluid 808 may be flowed into the dipole-inducing magnetic field 704 and gradient magnetic field 712 of FIG. 7.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A process of sorting metallic single wall carbon nanotubes (SWNTs) from semiconducting SWNTs, comprising:
   A. disposing the metallic SWNTs and the semiconducting SWNTs in a dilute fluid;
   B. applying a varying dipole-inducing magnetic field to the metallic SWNTs and the semiconducting SWNTs in the dilute fluid, including varying the dipole-inducing magnetic field with time so as alternately increase the dipole-inducing magnetic field with time and decrease the dipole-inducing magnetic field with time, and in which the applying a varying dipole-inducing magnetic field includes:
      i. providing an upper dipole-inducing electromagnetic coil and a lower dipole-inducing magnetic coil;
      ii. applying to the upper dipole-inducing electromagnetic coil a current with a triangular profile waveform; and
      iii. applying to the lower dipole-inducing electromagnetic coil a current with a triangular profile waveform that is synchronized with the triangular profile waveform of the current in the upper dipole-inducing electromagnetic coil; and
   C. applying a spatial gradient magnetic field to the metallic SWNTs and the semiconducting SWNTs in the dilute fluid, including:
      i. providing an upper gradient electromagnetic coil and a lower gradient magnetic coil;
      ii. applying to the upper gradient electromagnetic coil a current with a square-wave profile waveform; and
      iii. applying to the lower gradient electromagnetic coil a current with a square-wave profile waveform that is synchronized with the square-wave profile waveform of the current in the upper gradient electromagnetic coil.

2. The process of claim 1 in which the applying a varying dipole-inducing magnetic field includes orienting the metallic SWNTs in the dipole inducing magnetic field.

3. The process of claim 1 in which the applying a spatial gradient magnetic field includes spatially separating the metallic SWNTs from the semiconducting SWNTs.

4. The process of claim 1 in which said dilute fluid has a pressure less than 1 millitorr.

5. The process of claim 1 in which applying a varying dipole-inducing magnetic field includes applying ramp rates of current through the upper dipole-inducing electromagnetic coil and the lower dipole-inducing electromagnetic coil sufficient to provide a dipole inducing magnetic field to the SWNT that has a field strength, varying in time at a rate of at least 1000 Tesla/second, that is sufficient to produce an orientation configuration of the metallic SWNTs within 45 degrees of an axis of the dipole-inducing magnetic field.

6. The process of claim 1 in which applying a spatial gradient magnetic field includes applying an upper gradient electromagnetic coil current square-wave profile waveform so that current is positive and substantially constant during a positive ramp phase of a triangular profile waveform and is negative and substantially constant during a negative ramp phase triangular profile waveform, and applying a lower gradient magnetic coil current square-wave profile waveform that has a profile opposite the upper gradient magnetic current square-wave profile waveform so that current is negative and substantially constant during a positive ramp phase of a triangular profile waveform and is positive and substantially constant during a negative ramp phase of a triangular profile waveform.

7. The process of claim 1 in which applying the upper gradient electromagnetic coil current waveform and the lower gradient electromagnetic coil current waveform includes applying a magnitude of the upper gradient electromagnetic coil current waveform that is substantially equal to a magnitude of the lower gradient electromagnetic coil current waveform so that a magnetic field with a spatial gradient is provided to the SWNT which is parallel to the dipole-inducing magnetic field provided by the dipole inducing electromagnetic coils.

* * * * *